United States Patent [19]

Greenleaf, Jr. et al.

[11] 4,122,013
[45] Oct. 24, 1978

[54] SEWAGE TREATMENT SYSTEM

[76] Inventors: John W. Greenleaf, Jr., 1451 Brickell Ave., Miami, Fla. 33131; Harold E. Schmidt, 641 W. 53rd St., Hialeah, Fla. 33012

[21] Appl. No.: 851,771

[22] Filed: Nov. 15, 1977

[51] Int. Cl.² ............................................. C02C 1/08
[52] U.S. Cl. .............................. 210/195 S; 210/197; 210/202; 210/206; 210/262; 210/275
[58] Field of Search ..................... 210/16, 170, 195 R, 210/195 S, 197, 199, 202, 205, 261, 262, 532 S, 3-8, 255, 150, 151, 206, 275, 79-82

[56] References Cited

U.S. PATENT DOCUMENTS

| | | | |
|---|---|---|---|
| 3,166,501 | 1/1965 | Spohr | 210/16 |
| 3,228,531 | 1/1966 | Proudman | 210/532 S |
| 3,306,447 | 2/1967 | Medeiros | 210/202 |
| 3,666,106 | 5/1972 | Green | 210/16 |

FOREIGN PATENT DOCUMENTS 1,402,406  7/1964  France ........................................ 210/16

Primary Examiner—Thomas G. Wyse
Assistant Examiner—Benoît Castel
Attorney, Agent, or Firm—Watson, Cole, Grindle & Watson

[57] ABSTRACT

A sewage treatment system is divided into two stages with a collection system dispersed therebetween. The first stage includes anoxic treatment units producing an anaerobic effluent which is moved through the vacuum tight collection system to the second stage of treatment including an oxidation unit producing an aerobic effluent containing nitrates, dissolved oxygen and activated sludge. The two liquids are mixed in a chamber and are subjected to treatment before discharge for producing a highly treated effluent from which a major part of the nutrients have been removed.

1 Claim, 4 Drawing Figures

SEWAGE TREATMENT SYSTEM

BACKGROUND OF THE INVENTION

This invention relates generally to a system of sewage treatment and transport in which the sewage undergoes initial treatment at or near its point of generation to condition it for transport through a collection system to a central treatment plant where, after the completion of treatment, the innocuous liquid remaining is discharged into a stream, lagoon, or other body of water, or may be utilized for irrigation or such other purposes where the use of recycled water is permitted.

The term "sewage" as used herein is defined as the liquid waste containing both dissolved and suspended solids resulting from the discharge of toilets, baths, sinks, laundry tubs, and other fixtures in residential building or commercial establishments. Although the quantities of dissolved and suspended solids are relatively small, they contain substantial amounts of organic material which are putrescible and which may give off foul and corrosive gases if not treated promptly. For this reason, sanitary sewerage systems have customarily been designed to provide a gravity flow of the sewage from the point of entering the system to its final discharge.

Such systems are normally designed to provide velocities of at least 2 feet per second to ensure the prompt arrival of the sewage at the treatment plant or disposal site. Large amounts of water are also required to carry the solids at the velocity through the gravity system.

In hilly terrain sufficient natural differences in elevation normally exist to effectively permit the gravity flow of sewage. However, where sufficient natural differences in elevation do not exist, sewage is collected in sumps or wet wells at pump stations at one or more low points in the system, from which it must be pumped through force mains toward the treatment plant or outfall point.

Gravity sewers are constructed of relatively large diameter pipes so as to accommodate peak flows and so as to avoid being obstructed by the passage of solids contained in the sewage which are frequently stranded in the pipe system during periods of low flow, and are subsequently recaptured during later periods of high flow.

Where sewers are constructed to serve a sparsely settled area or one where there is little natural slope to permit adequate gravity flow, sewage remains for long periods in the collection system with the result that it becomes septic and solids accumulate to cause stoppages within the system. Under such conditions the operation of the system becomes difficult and expensive as foul and corrosive gases cause severe corrosion within the collection system and odor nuisances at and in the vicinity of pumping stations or treatment plants, and severe objections by residents in the neighborhood, which with the forthcoming programs for water and energy conservation will become more severe.

An inherent fault with the gravity collection of sewage is the leakage of water from outside of the sewer pipe into the system through the numerous joints between the individual pipes and fittings. Such infiltration will vary with the type of sewer construction and the relative location of the sewer to the groundwater table. In extreme cases infiltration can severely restrict the capacity of the sewer for receiving sewage. Although moderate quantities of infiltration will improve the flow in an underutilized sewerage system, capacity for its treatment must be provided at the treatment plant with the corresponding increase in the cost of system operation. Cost of treatment of groundwater infiltration often reaches fifty percent of the entire plant operation.

The requirement that a gravity sewer system maintain a continually downward gradient throughout its length can result in high system costs as deeper trenches and hard and expensive excavation is encountered in the lower reaches of a system. This may become even more critical with water saving devices at the home.

The typical gravity sewer must be constructed initially providing for its ultimate capacity so that a heavy financial burden is placed on a growing community in the early years of its existence, when funds for the payment of capital expenses are difficult to obtain and often limit the ability of a community to provide such a needed service. Furthermore, the construction of the ultimate required capacity results in the underutilization of the system and causes an undue financial burden on everyone involved. This is especially true now that government grants for sewer construction are being limited to present needs and are based on a coast effective analysis.

Although the sewage treatment plant makes up a substantial part of the overall cost of providing a complete sewerage system, it has generally been possible to construct it in stages paralleling the growth of the area served by the system so as not to be an undue financial burden.

Current trends toward seeking a cleaner environment have resulted in the need for more extensive and sophisticated methods of waste water treatment.

Methods developed to meet these requirements are progressively more expensive to construct and operate, require greater technology and are more labor intensive, with the result that the cost of sewage treatment assumes a far greater financial burden on the system users as the demands for improved treatment continue.

The increase in cost to provide advanced wastewater treatment and the need to provide for large diameter pipes in the conventional collection system quickly place the cost of providing proper sewerage facilities beyond the economic means of small and growing communities.

Since public health considerations require that all citizens be provided with a safe water supply free from enteric organisms, the extension of sewerage systems to serve all dwellings in small and growing communities becomes imperative and means to accomplish it must be provided.

SUMMARY OF THE INVENTION

It is therefore an object of this invention to provide a sanitary sewerage system for serving a small or growing community which can be constructed and operated at a minimum cost and at the same time produce a highly purified effluent meeting the highest standards that can be safely discharged into a receiving body without danger to health or to the environment.

Another object of this invention is to provide as a part of the sewerage system a treatment plant that does not require a high degree of technology for its proper operation while permitting a minimum amount of attendance for its operation and maintenance and at a minimum energy cost compared to that provided by a gravity collection and treatment system.

Since one of the prime concerns in a sewerage system serving a limited number of dwellings is the lack of flow to prevent solids in the sewage from causing stoppages within the system, a further object of the present invention is the preconditioning of the sewage by the removal of inorganic solids normally contained in it and by the stabilization of the organic matter remaining into a soluble form prior to its entering the collection system.

A still further object of this invention is to conduct the previously conditioned sewage from its point of entry into the system through a completely closed system to the point of final treatment without manholes, open wet wells, or other structures along the route which can disseminate odors into the surrounding areas.

To accomplish the several aforementioned objectives, a technique has been developed in accordance with the invention of dividing the sewage treatment system into two separate and distinct parts and interspersing the collection system between them. The first part of the disposal system — the anoxic or nonoxidizing stage, comprises a dual compartment covered tank(s) usually buried at a convenient location to receive sewage by gravity from one or more residences or commercial buildings in the vicinity. The receiving compartment of the tank is proportioned to provide a retention period of about 72 hours for the sewage entering it to allow time for settleable matter (principally inorganic) in the sewage to separate from the remaining liquid and be retained in this compartment. Anoxic conditions are maintained here to promote the growth of anaerobic bacteria which act upon the organic matter contained in the settleable solids converting it largely to odorless gases or to a soluble condition. These gases are either vented back through the incoming sewer or are dissolved in the remaining liquid to be discharged with it. The small amount of residue remaining is largely inorganic and can remain in the tank for long periods without interfering with its operation.

The second compartment of the tank is separated from the first by a dividing wall which is provided with a series of ports near the bottom to admit liquid from the first compartment. This compartment is filled practically to its top with a coarse filter media or fixed filter media of a type selected to provide a large surface area to which the anaerobic organisms can adhere and come into intimate contact with the liquid discharged from the first compartment as it flows upwardly and toward the outlet of the tank. The prolonged and intimate contact provided in this compartment for the liquid discharged from the first compartment permits a long solid retention time within it and a long residence time for the anaerobic organisms to remove a considerable portion of the dissolved organic matter from the liquid, thus stabilizing the liquid discharged from the tank so that it can be transported or stored with little concern for the time required.

The treated discharge from the aforementioned tank is collected in a covered sump into which it flows by gravity from the anoxic treatment unit(s). When the liquid level reaches a predetermined height in the sump, it is admitted into a vacuum collection system through a control and flow valve system as described in U.S. Pat. No. 3,998,736, to John W. Greenleaf, Jr., dated Dec. 21, 1976. The stabilized and partially treated sewage moves successively through the collection system as additional slugs of liquid and air are admitted through the control valve. Neither the time required in the collection system for the liquid to reach the vacuum receiving unit, nor the velocity within the pipe system is of importance to its successful operation since settleable solids have been previously removed and the liquid has been stabilized prior to entering the system.

The collection system is a vacuum tight system constructed of relatively small diameter plastic pipe laid in a shallow trench with only sufficient regard to grade to avoid conditions where the vacuum in the system is insufficient to cause flow. The pipe system can be proportioned to serve a single or multiple anoxic treatment unit for delivering the stabilized liquid to the vacuum receiving unit which in turn can be proportioned to receive the flow from a single or multiple pipe collection system. The details of each system will vary with the number, size, and location of the units to be served and the extent, topography, and climatic conditions of the site.

Vacuum within the receiving unit is maintained by a motor operated vacuum pump which is controlled by a vacuum switch adjustable to maintain the vacuum within a predetermined level. The collection system connects to the vacuum receiving unit at a point above the maximum liquid level to allow air and liquid in the collection system to separate easily upon entering the tank. Liquid thus separated is removed from the tank through a connection at the bottom by a motor driven pump which is controlled by float switches located within the tank so as to maintain the liquid level in the tank within prescribed levels. The pump discharges through a force main to the oxidation stage of treatment in the second part of the plant.

The pump discharge to the second stage of treatment will be in intermittent slugs, the frequency and number of which will depend directly on sewage flow into the system without the equalizing effects afforded in a conventional system through the use of oversize pipes, gravity flow, wet wells, etc. Also, this discharge has been anaerobically stabilized and must be neutralized by mixing with an oxygen rich liquid so as to prevent the formation and dissemination of foul odors from open tanks in the plant which could otherwise cause complaints from neighbors.

To provide neutralization of the anaerobically stabilized pump discharge, oxygen charged liquid and activated sludge is pumped from the filter influent chamber at a constant rate and mixed with the pump discharge in the inlet to a neutralization unit which is baffled and contains a fixed filter media to ensure mixing of the liquids and to provide sufficient solids retention time to complete the reaction between them. The recirculation rate is set to assure the neutralization of the anaerobically stabilized pump discharge.

To provide for the equalization of flow, an equalization unit is provided. To accomplish the equalization of flow, this unit discharges through a constant head orifice-controlled device which prevents the discharge into the oxidation unit at above a predetermined maximum rate thus providing for excess flows to be stored in the equalization tank unit until needed to make up any deficiency in the incoming flow required to meet the predetermined discharge. Air or gas is bubbled through a manifold in the bottom of the tank at a sufficient rate to ensure mixing and to prevent the settlement of the activated slude floc in the unit. The recirculation rate assures a minimum flow through the oxidation unit when there is no flow from the collection system.

Taking the recirculation from the filter inlet chamber under the filters automatically returns any activated sludge that may have escaped the oxidation and activated sludge tank for further treatment, while at the same time preventing the build-up of solids in the filter inlet chamber. The return of these solids so that they may again pass through the oxidation chamber assures that all the organic matter will be converted to carbon dioxide with little or no residue remaining in the system which would require removal.

Following the neutralization and equalization units, the mixed flow enters the oxidation unit at a relatively uniform rate. Compressed air is supplied to the tank through a perforated or porous manifold generally located in the bottom of the tank so as to induce mixing and circulation of the tank contents. Aerobic organisms of the activated sludge type are maintained in the oxidation unit which in the presence of air consume the organic matter remaining in the sewage by converting it to carbon dioxide a soluble gas which is discharged with the liquid from the plant. The rate of aeration, the retention time, and recirculation rate may each be varied to obtain the optimum treatment within the unit. The oxidation unit is designed for continuous operation with a constant flow device regulating the inflow rate and a weir provided so that the discharge along the entire side of the tank can equal the rate of inflow. Because of the constant agitation within the oxidation unit, activated sludge particles will be discharged with the liquid from the oxidation unit which must be recaptured and returned to the process for further treatment and oxidation.

To recapture these particles and any suspended solids that may remain, an upflow filter unit has been provided. This unit comprises two filter units constructed within a single tank and separated by a division wall that reaches to a height just above the level of the filter media above which the tank becomes a single compartment extending above both filters to its discharge level. This upper compartment is proportioned so as to provide the time needed to effect sterilization of the plant effluent with a hypochlorite solution of a type commonly used for this purpose. The hypochlorite solution is fed at a constant rate to the compartment from a storage tank and through a constant head device. With the constant flow from the oxidation tank to and through the filter a predetermined and constant rate of chlorination will result. The discharge from this compartment will meet the highest standards of the art for the treatment of domestic sewage even considering the requirements for tertiary treatment.

Flow from the oxidation unit enters either or both compartments under the filter units and flows upwardly through them before entering the common compartment above-described. Each filter unit is constructed of progressively finer material from bottom to top, beginning with a material that can be supported on a grate and progressing in succeeding layers to a fine classification of filter media. This type of filter permits the capturing of solids throughout a greater part of its depth with the result that as solids are captured the capacity of the filter to pass liquid is progressively reduced and the rate of flow through the unit is reduced to where the filter no longer can carry the required flow. When a predetermined minimum flow has been reached, the filter unit is taken out of service by closing the inlet valve and opening a drain valve on the underside of the filter. This causes the direction of flow within the filter to reverse and chlorinated effluent is drawn down through the filter to flush out any accumulation of solids in the body of the filter. Flushing may be continued as long as necessary using the other filter as the source of supply of flushing water. Compressed air can also be introduced into the compartment under the filter at an appropriate time to cause an additional scrubbing action to aid in loosening solids accumulations within the filter.

Following the flushing, the filter can be returned to service until conditions require that the process be repeated. Ordinarily, a schedule is developed for filter backwashing which becomes a normal part of the operation and maintenance schedule.

A single or possibly dual compressor unit provides all the air required for plant operation, and a single or possibly dual pump unit provides the recirculation needed for plant operation. Thus, it will be seen that this invention provides the highest possible degree of treatment of domestic sewage while utilizing the simplest of mechanical equipment and technology.

DETAILED DESCRIPTION OF THE INVENTION

Figure 1:
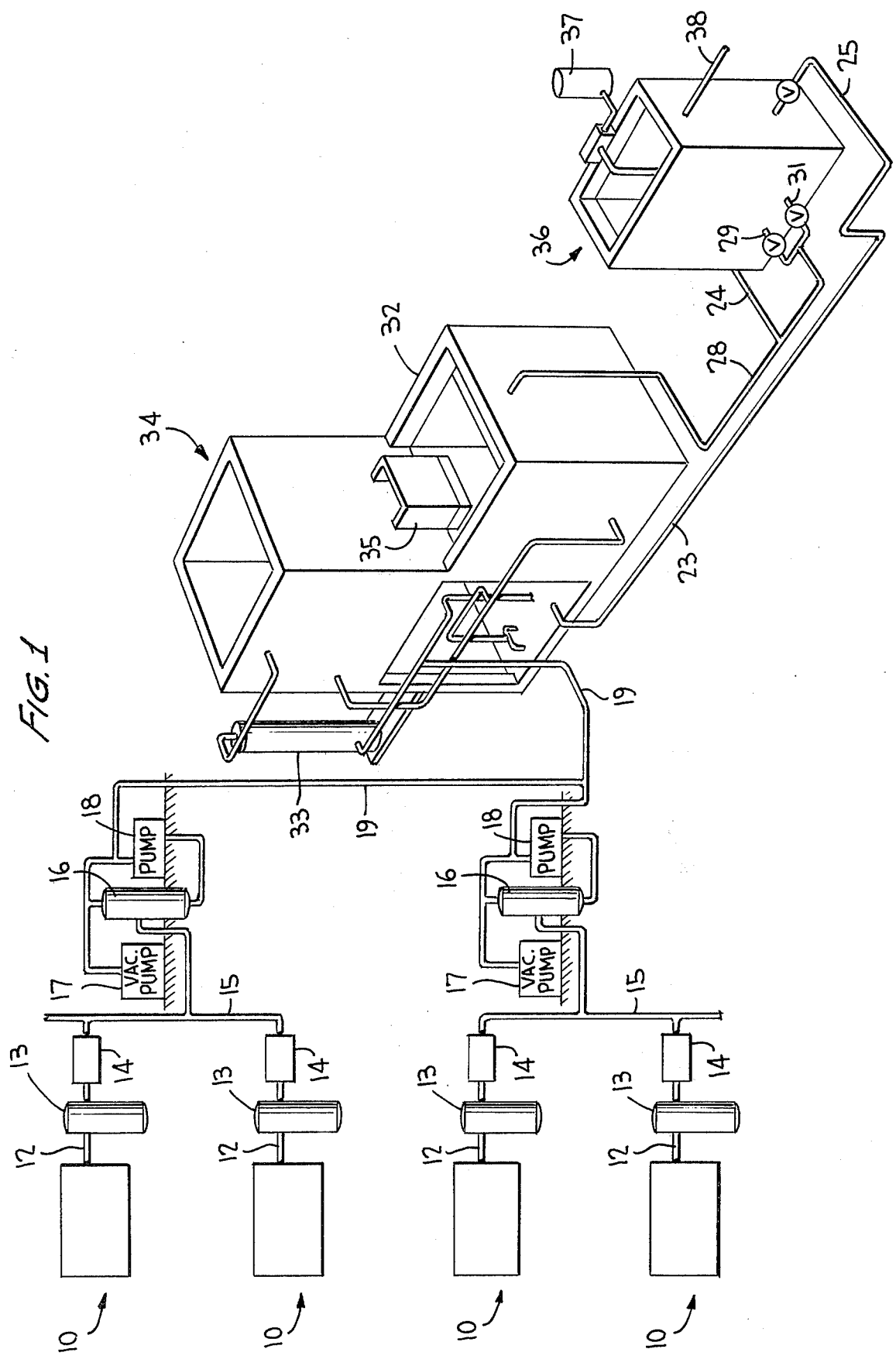
FIG. 1 is a schematic assembly view of the various elements of the present system arranged to show their sequence of operation and relation to each other.
Figure 2:
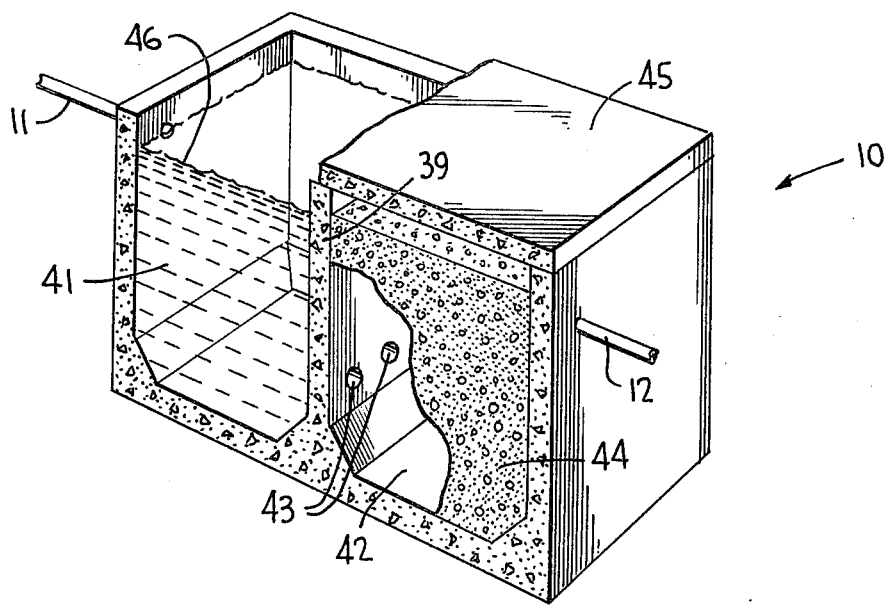
FIG. 2 is a sectional perspective view of a typical anoxic treatment unit of the FIG. 1 system, with the cover removed from the first compartment for showing the relative operating level maintained within it.

Turning now to the drawings wherein like reference characters refer to like and corresponding parts throughout the several views, a plurality of anoxic tanks, generally designated 10, are shown in FIG. 1 and are each of the same general construction as shown in FIG. 2. Each tank is so disposed as to receive sewage by gravity from one or more residential or commercial sources through an inlet 11 provided on each tank. As sewage enters the tank inlet, a similar quantity of anoxically treated liquid is discharged from the tank from which it flows by gravity through a piped connection 12 and enters a sump, generally designated 13 in FIG. 1, associated with each tank. Each sump comprises a watertight receptacle with a closed cover into which depends a small diameter pipe with a drop leg extending nearly to the bottom. An inverted bell is attached to the drop leg at a predetermined height and is connected through tubing to a control valve located outside the sump. The control valve and a flow valve to which it is operably connected are located in a separate covered vault 14, in reasonable proximity to its sump 13. The flow valve is connected to a vacuum collection system 15 and to the pipe depending into sump 13 in a manner such as to remain closed except when required to open by operation of the control valve. In the closed position the flow valve prevents flow from sump 13 to vacuum system 15. When the liquid level in sump 13 rises to a predetermined level, the increased pressure within the inverted bell is transmitted to the control valve which in turn causes the flow valve to open and remain open until the sump is emptied. The flow and control valve system described above are set forth in U.S. Pat. No. 3,998,736, issued Dec. 21, 1976 to John W. Greenleaf, Jr., the entire disclosure of which being specifically incorporated herein by reference.

Vacuum collection system 15 can be extended to serve a number of anoxic treatment units 10 through sumps 13 and flow and control valves 14 located in a widely dispersed area such as are common in small communities, resort developments, rural areas, and the like.

Anoxically treated liquid and slugs of air move through the collection system each time a flow valve is operated until they enter a vacuum receiving unit 16 at a point above the normal liquid level where the air is separated from the liquid and discharged from the system through a vacuum pump 17. Vacuum pump 17 is controlled by a vacuum switch to maintain the vacuum needed to assure the flow through the collection system and to remove accumulated air and gas from the receiving unit. Float switches within vacuum receiving unit 16 start a pump 18 at a predetermined level and shut off the pump when unit 16 has been emptied.

Pump 18 discharges into a force main 19 which delivers the liquid to the second stage of the sewage treatment system. It is to be noted in FIG. 1 that multiple vacuum receiving tanks 16 with discharge pumps 18 may discharge into force main 19 thus permitting the system to be extended either as the area served increases or the development reaches the capacity of the initial installation, thus permitting the collection system to grow with the need and with the capability of the user to pay for the service required.

Vacuum receiving tank 16 with its vacuum pump 17 and discharge pump 18 with their respective vacuum and float switches are of a design commonly used in the art and represent nothing novel except that they provide for the movement of the treated liquid through the collection system from the anoxic unit to the second stage of treatment through force main 19.

Force main 19 (FIG. 3) joins with a discharge pipe 21 from a pump 22 which is connected to suction pipes 23, 24 and 25 (FIG. 4) to withdraw liquid from the underside of filters 26 and 27 together with the accumulated activated sludge. Chambers 20 and 20a under filters 26 and 27 are supplied with oxidized liquid and excess activated sludge through pipes 28, 29 and 31 which in turn receive the discharge from an oxidation tank 32. Pump 22 thus returns to discharge pipe 21 oxidized liquid and accumulated activated sludge which mixes with the anoxically treated liquid in force main 19 prior to entering a neutralization tank 33. The flows from force main 19 and discharge pipe 21 are intimately mixed in tank 33 in which they are retained for a sufficient period of time to complete the oxidation of the anoxic liquid contained in main 19, thus eliminating any odors that might otherwise be caused on the release of dissolved gases in the anoxic liquid when it is exposed in open tanks.

Tank 33 discharges into an equalization tank 34 which is proportioned to receive the several periods of peak flows daily from force main 19 which are characteristic of this type of system and which, unless equalized, could have an adverse affect on the secondary treatment process. It is also proportioned to receive the recirculation flow around the oxidation unit required both for the neutralization of the anoxic inflow and for the complete oxidation of the organic matter remaining in the discharge from the oxidation tank 32. Thus recirculation through tanks 33 and 34 provides a constant minimum discharge from tank 34 into oxidation tank 32 to which is added at a predetermined constant rate the flow from the collection system as established by a constant flow chamber 35.

Oxidation tank 32 is of a known type using compressed air for both mixing the tank contents and for supplying the microorganisms with oxygen for the production of what is commonly called "activated sludge." Air is supplied by a motor driven compressor 30 through a perforated pipe or porous tubes 40 located in the tank so as to cause circulation of the tank contents and the intimate contact of the air bubbles with the entire tank contents. A weir 50 is provided to permit a uniform rate of discharge along the entire length of the tank.

A filter unit, generally designated 36 (FIG. 4), receives the mixture of oxidized liquid and activated sludge discharged from oxidation unit 32 through pipe 28 which in turn supplies the two compartments 20 and 20a under filter units 26 and 27 through subfeeder pipes 29 and 31. The liquid in the discharge from the oxidation tank easily flows upwardly through the filter media of units 26 and 27 while the activated sludge and any other particles are retained in compartments 20 and 20a under the filter or are entrapped in the media and do not pass through the filter. A hypochlorite solution from a hypochlorite storage tank 37 is added to the clear liquid emanating from the filter units into a chamber 49, at a predetermined rate proportional to the rate of flow through the filters. The capacity of chamber 49 above the filters allows a sufficient period of time for the hypochlorite solution to sterilize the filter effluent to remove any remaining bacteria or virus. The finally purified and sterilized effluent is discharged from a pipe 38 to enter a lagoon stream or to be recirculated as the case may be. Activated sludge retained in compartments 20 and 20a under the filters is returned through pipes 23, 24 and 25 together with oxidized liquid to pump 22 where it reenters the process. Excess activated sludge and inert materials remaining from the process are flushed from the system through valved blowdown pipes 58 and 59 during the backwash of the filters.

Referring now in more detail to the components comprising the present treatment system, reference is made to FIG. 2 showing an anoxic tank 10 representative of the tanks shown in FIG. 1. The tank is a rectangular watertight structure with sides and bottom having dimensions proportioned to provide a retention period based on the average anticipated design flow sufficient to remove all setteable solids from the incoming sewage and to convert the liquid in the tank to a stable anoxic condition. A partition 39 separates the tank into a settling compartment 41 and a stabilization compartment 42. A series of ports 43 are located near the bottom of partition 39 to ensure that flow from compartment 41 enters compartment 42 near the bottom so as to flow upwardly through filter media 44 in compartment 42. A precast cover 45, shown over only compartment 42, also extends to cover compartment 41. Sewage enters tank 10 through inlet 11 which is located near the top of the tank and at a point just above liquid level 46 so as to permit air or gases to be vented back through the sewerage system. Sewage solids settle to the bottom of compartment 41 where they undergo anaerobic decomposition and are largely converted to a gas either to be vented through inlet 11 or dissolved in the liquid. The remaining liquid then passes through ports 43 and upwardly through media 44. Anaerobic organisms which adhere to the surface of media 44 provide prolonged contact with the liquid converting it into a stable condition after which it is discharged through pipe 12 to enter sump 13 previously described with reference to FIG. 1.

Figure 3:
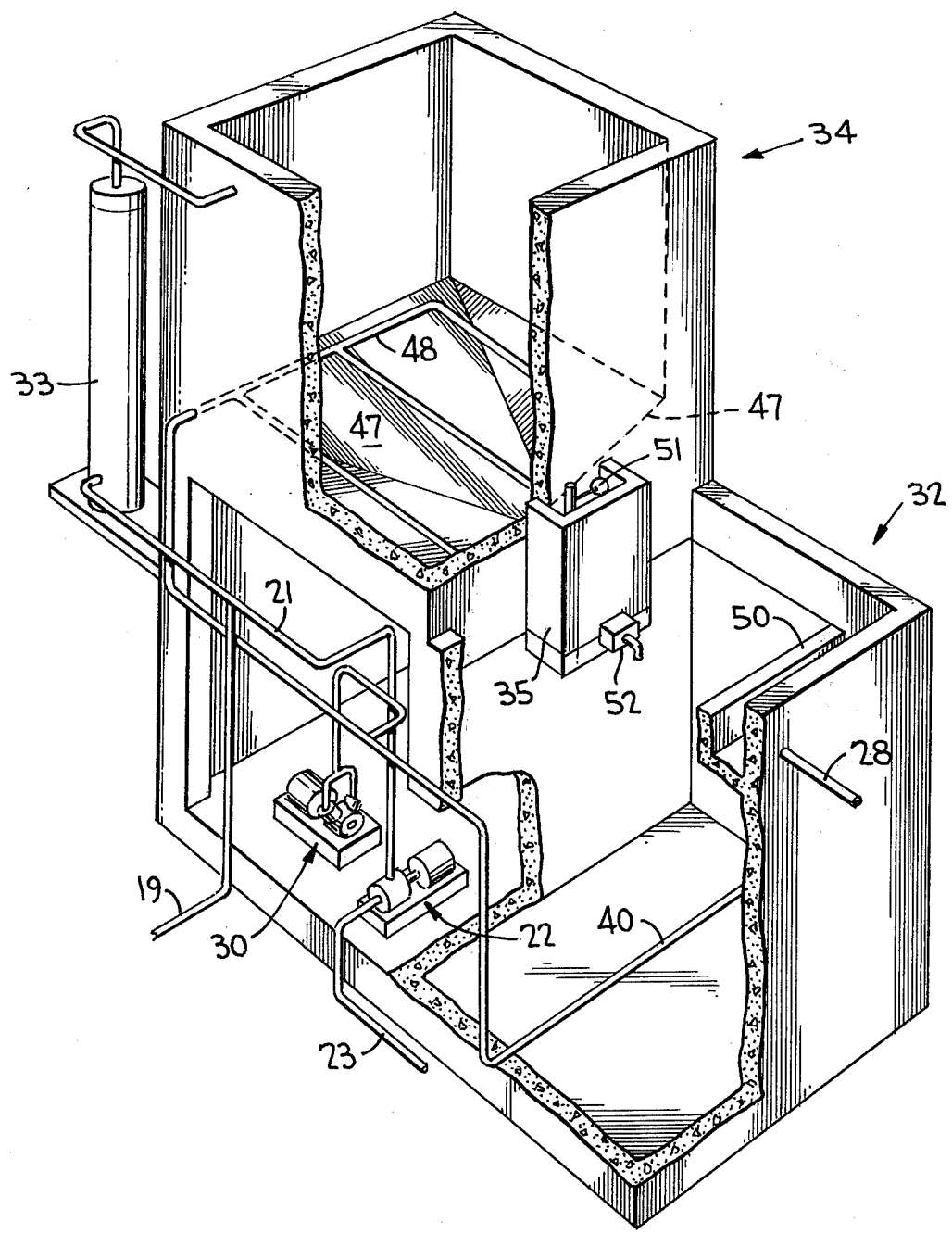
FIG. 3 is a perspective view, in part section, of a neutralization, equalization and oxidation unit of the FIG. 1 system, and the relationship between them.

FIG. 3 is an enlarged view of units 32, 33, 34 and 35, shown in FIG. 1, to better show the interrelationship between these units both physically and functionally. Tank 33 is a closed tank having baffles and fixed bed media (not shown) to facilitate mixing of the anoxic and oxygen containing liquids from force main 19 and pump discharge pipe 21. Each of the other units is an open-topped tank constructed of reinforced concrete. Tank 34 is provided with a sloping hopper bottom 47 leading to its outlet to tank 35. A perforated pipe manifold 48 is located on hopper bottom 47 through which air from compressor 30 is bubbled to prevent the settling of activated sludge particles during the time when they are stored in the tank. Discharge from tank 34 is through a float valve 51 in tank unit 35 which maintains the maximum liquid level constant during periods of maximum discharge. Discharge from tank 35 through an outlet (not shown) is controlled by a gate valve 52 which can be adjusted to provide optimum operating conditions in tank 32.

Gate valve 52 is situated so as to discharge above the normal operating level in tank 32 and at the same time so as to drain the contents of tank 35. Float valve 51, controlling the inlet into tank 35 and the water level within it, must be located so as to provide sufficient depth in tank 35 to permit operation of gate valve 52. Float valve 51 must, at the same time, be located so as to drain tank 34. In other words, tanks 35 and 34 must each be successively higher than tank 32. FIG. 3 shows tank 34 supported on one side by the top of tank 32 and tank 35 depending from the common wall of tanks 34 and 32. The other side of tank 34 is shown supported by columns extending to the level of the floor of tank 32. The space thus provided under tank 34 provides an ideal location for the compressor 30 and pump 22 installation needed for plant operation which can be enclosed as necessary for security or aesthetic reasons.

Figure 4:
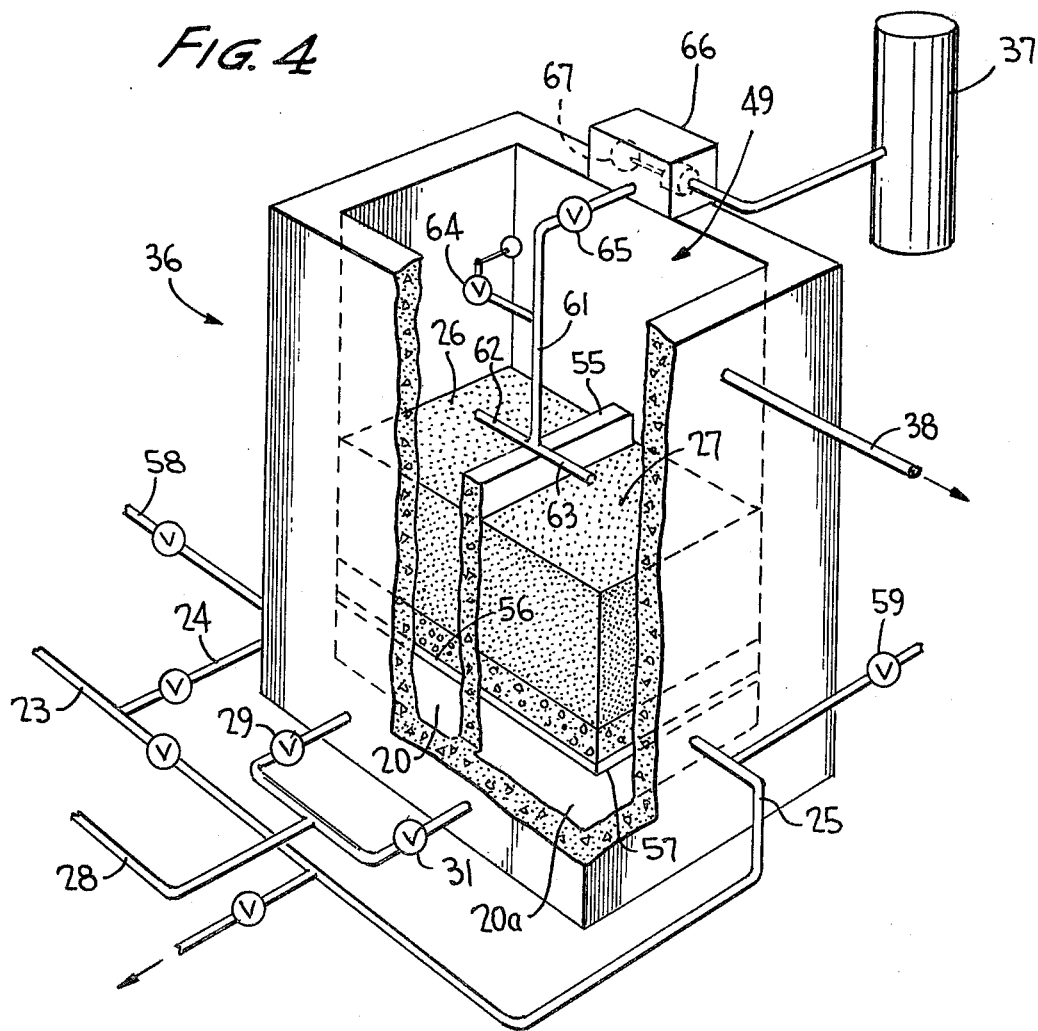
FIG. 4 is a perspective view of a dual upflow filter unit, made part of the assembly of FIG. 1, with a portion of the exterior wall cut away to show the interior construction of the unit.

FIG. 4 is an enlarged cutaway perspective view of dual upflow filter unit 36 and hypochlorite storage tank 37. The discharge from tank 32 is conveyed to filter unit 36 through pipe 28, shown in FIGS. 1 and 3, and enters compartments 20 and 20a through valved inlet pipes 29 and 31. Compartments 20 and 20a are separated from one another by a division wall 55 between filters 26 and 27, and are separated from filters 26 and 27 by gratings 56 and 57 which support the filter media above these compartments and allow liquid to flow upwardly therethrough. Compartments 20 and 20a are each connected to suction pipe 23 via valved connections 24 and 25 which selectively permit the return of activated sludge and liquid from either or both compartments A valved branch 58 on pipeline 24 is provided through which filter 26 can be backwashed, and a valved branch 59 is provided on pipeline 25 through which filter 27 can be backwashed when this operation becomes necessary due to any clogging of the filter media in the units. The filtered liquid above filters 26 and 27 fills chamber 29 to the level of overflow pipe 38. When the flow to filter unit 36 exceeds the return flow to units 33 and 34 by reason of inflow from the collection system, the excess flow passes upwardly through the filter and is discharged through overflow pipe 38 at a constant rate determined by valve 52 on tank 35. The liquid level in the upper compartment of filter unit 36 must rise to cause discharge through overflow pipe 38.

A hypochlorite feed pipe 61 extends downwardly to perforated branches 62 and 63 situated immediately above the filters 26 and 27. A float valve 64 is placed in feed pipe 61 and is arranged so as to permit flow through pipe 61 only when liquid is being discharged through overflow pipe 38. A valve 65 in feed line 61 controls the quantity of hypochlorite solution permitted to flow through pipe 61 from a constant head tank 66 which assures a uniform rate of flow at outlets 62 and 63. A float valve 67 on the outlet from hypochlorite storage tank 37 ensures a constant rate of feed into tank 66, thus permitting the sterilization of the plant effluent at a constant predetermined rate.

From the foregoing it can be seen that the sewage treatment system of the invention includes a series of anoxic units at the source of sewage production which effect the removal of solids contained in the sewage thereby resulting in the production of an anaerobically treated effluent. This treatment, while resulting in a substantial degree of purification, nevertheless does not generally meet the standards now required for waste water treatment. The treatment during the anoxic first stage of the process results in the conversion of certain of the solid organic carbonaceous materials to a liquid form which is discharged with the effluents. After being transported through the collection system this anaerobically treated liquid enters a central or second stage treatment unit where additional treatment is provided.

One of the contaminants contained in sewage of domestic origin is ammonia resulting from the inclusion of urine and other ammonia containing waste from the life process. It is readily soluble in water and is one of the elements to be removed in the treatment process. In the presence of dissolved oxygen, as in the case of activated sludge, ammonia is converted first to nitrites then to nitrates which remain in the effluent of the normal activated sludge process.

It has been found that the nitrates contained in the treated sewage effluent is a nutrient that causes eutrophication of streams and lakes. The advanced waste treatment now being required calls for the removal of such nutrients. One of the common ways of accomplishing this is to feed the chemical methanol to the liquid and then, after a reaction takes place, to pass it through a filter before discharge of the effluent. The methanol provides a carbonaceous material to react with the nitrates in the treated sewage, thereby permitting its removal.

In the present invention, carbonaceous material contained in this effluent from the anoxic units is mixed in tank 33 with the return liquid from chambers 20 and 20a located beneath the filters in tank 36. This liquid contains both dissolved oxygen and nitrates along with the return activated sludge. The carbonaceous and nitrogenous materials react in tank 33 to remove the nitrates from the system, while the dissolved oxygen acts upon the gases contained in the anoxic effluent to remove any odors which otherwise would continue into the second stage of the process. Fixed bed media within this tank provide the surface area for the denitryfying organisms to attach and remain in the tank.

Tank 33 discharges into equalization tank 34 in which the discharge is agitated by air bubbles to prevent the settling of activated sludge particles during the time the discharge is stored in this tank.

Liquid then enters oxidation tank 32 via tank 35. Such liquid contains a considerable amount of organic matter which, together with the oxygen from the aeration process, will promote the growth of aerobic microorganisms within the tank, which consume the organic matter. These organisms, called activated sludge, remain in suspension in the oxidation tank and are discharged with the liquid over the outlet weir through pipe 28 to chamber 20 and 20a under the filters or filter unit 36. The activated sludge is a light and flocculent material which remains suspended in the liquid and is easily transported by it. The purpose of the filter units is to separate the treated liquid from the activated sludge. Thus, as the treated liquid flows upwardly through the filters, the activated sludge remains in chamber 20 and 20a where it is concentrated and must be removed by recirculation back to the plant inlet at tank 33.

Effluent sterilization takes place in chamber 49 of filter unit 36 and, because of the nature of filters 26 and 27, contains only clarified effluent which, after chlorination, is ready for discharge. The plant is intended to operate continuously. During periods of no flow from the collection system, recirculation pump 22 will operate continuously at a constant rate taking oxidation tank 32 discharge from compartments 20 and 20a with its accumulated axtivated sludge and returning it through tanks 33 and 34 to oxidation tank 32. During periods of inflow from the collection system, flows in excess of a predetermined amount will be stored in tank 34 and fed at a constant rate to oxidation tank 32 through tank 35 as controlled by means of flow valve 51 and control valve 52. The discharge from tank 32 will be at a constant rate equal to the inflow. During such periods, flow in excess of the recirculation rate will flow upwardly through the filters to chamber 49 above and will be discharged through outlet 38. Such flow will be at a constant rate, depending upon the adjustment of control valve 52 from tank 35. Thus, with float valve 64 in chlorination chamber 49 arranged to open only when there is a discharge from the system and the rate of hypochlorite feed controlled through constant head tank 66 and valve 65, a proportionate automatic chlorination system is achieved.

Obviously, many modifications and variations of the invention are made possible in light of the above teachings. It is therefore to be understood that within the scope of the appended claims the invention may be practiced otherwise than as specifically described.

We claim:

1. A sewage transport and treatment system, comprising a first sewage treatment station including an anoxic unit having first and second compartment with removable covers, said first compartment having an inlet for receiving residential or commercial sewage and having upper and lower portions for respectively accumulating scum and settleable solids, said compartments being separated by means of a vertical partition having ports near the bottom thereof for the passage of settled sewage into said second compartment, an outlet on said second compartment, a coarse media filling said second compartment to provide a large surface area for the attachment of anaerobic slime, said media defining free flowing spaces in the interstices thereof to provide intimate and prolonged contact of the settled sewage on its passage through said unit to said outlet whereby the treated sewage is anaerobically stabilized before its conveyance through the transport system, a vacuum transport system for collecting the anaerobically stabilized sewage from the first sewage treatment station and delivering it to a second sewage treatment station, the second sewage treatment station including a mixing tank for mixing the anaerobically stabilized sewage with pumped recirculated oxidation tank effluent containing dissolved oxygen and activated sludge under pressure, an open equilization tank for receiving discharge from said mixing tank and being fluidly interconnected therewith, a float control outlet valve on said equalization tank including a float disposed in a flow control chamber for maintaining a constant level of the discharge in said chamber, an outlet on said chamber controlled by an adjustable gate valve for controlling the rate of flow of the discharge, an oxidation tank having an air distribution manifold and a compressor for aerating and mixing the contents thereof, said oxidation tank being located below said control chamber and having an outlet weir extending the length thereof, a filter tank fluidly connected to said oxidation tank for filtering out activated sludge for the effluent, said filter tank including a pair of upflow filter units containing filter media and independent compartments lying therebeneath for accumulating activated sludge from the effluent passing upwardly therethrough, piping for conducting the discharge from said outlet weir to said compartments and further piping to return the discharge containing both dissolved oxygen and activated sludge from said compartments at a constant rate through a pump to said mixing tank to be mixed with incoming anaerobically treated sewage and reintroduced into said second station, said filter units serving to filter aerobically treated sewage in excess of that recirculated through the mixing tank and aerobic treatment system at the rate of flow established at said control chamber, said filter tank including a chlorine contact chamber located above said filter units for effluent sterilization, said rate of flow establishing a discharge rate and a detention time in said chamber which is provided for the disinfection of the plant effluent before discharge, a constant head tank having distributing means extending into said contact chamber, and including a float valve control and a valve outlet for determining the rate of flow of disinfecting solution from a storage tank fluidly connected therewith, and means for backwashing the filter units to remove sludge accumulation therefrom.

* * * * *